United States Patent
Liu et al.

(10) Patent No.: US 8,170,414 B2
(45) Date of Patent: May 1, 2012

(54) BURST MODE DIGITAL DIAGNOSTIC AND CONTROL FOR PASSIVE OPTICAL NETWORK RECEIVING

(75) Inventors: JinXiang Liu, Singapore (SG); HuiJie Du, Singapore (SG); Miatsu Okitsu, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 1051 days.

(21) Appl. No.: 12/023,490

(22) Filed: Jan. 31, 2008

(65) Prior Publication Data

US 2008/0181603 A1 Jul. 31, 2008

Related U.S. Application Data

(60) Provisional application No. 60/887,460, filed on Jan. 31, 2007.

(51) Int. Cl.
*H04B 10/08* (2006.01)
(52) U.S. Cl. ............ 398/25; 398/135; 398/136; 398/72; 398/100; 398/22; 398/23; 398/24; 398/33; 370/352; 370/392; 370/342

(58) Field of Classification Search ............... 398/66, 398/67, 68, 69, 70, 71, 72, 98, 99, 100, 25, 398/9, 10, 17, 22, 23, 24, 26, 27, 33, 38, 398/79, 135, 136, 30, 31; 370/352, 392, 370/389, 468, 465, 342
See application file for complete search history.

(56) References Cited

U.S. PATENT DOCUMENTS

7,818,648 B2 * 10/2010 Haran .............................. 714/752
2007/0127923 A1 * 6/2007 Dalton et al. .................... 398/71
* cited by examiner

*Primary Examiner* — Hanh Phan
(74) *Attorney, Agent, or Firm* — Machoff Gilmore & Israelsen (57) ABSTRACT

Methods and systems for an optical line termination including instructions stored on a computer-readable medium, the instructions including a digital diagnostic table, and a plurality of entries within the diagnostic table, wherein a first entry is associated with a first optical network unit, the first entry including at least one setting for performing burst mode digital diagnostic processes using a first burst mode transmission received from the first optical network unit.

20 Claims, 4 Drawing Sheets

BURST MODE DIGITAL DIAGNOSTIC AND CONTROL FOR PASSIVE OPTICAL NETWORK RECEIVING

CROSS-REFERENCE TO RELATED APPLICATIONS

The present application claims priority from U.S. Provisional Patent Application Ser. No. 60/887,460, filed Jan. 31, 2007 and entitled "BURST MODE DIGITAL DIAGNOSTIC AND CONTROL FOR PASSIVE OPTICAL NETWORK TRANSCEIVERS," which is incorporated herein by reference in its entirety.

BACKGROUND

Background and Relevant Art

Computing and networking technology have transformed our world. As the amount of information communicated over networks has increased, high-speed transmission has become ever more critical. Many high-speed data transmission networks rely on optical transceivers and similar devices for facilitating transmission and reception of digital data embodied in the form of optical signals over optical fibers. Optical networks are thus found in a wide variety of high-speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed therethrough, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

During the operation of the optical transceiver, it is often useful to perform diagnostics of the various operational parameters. A typical way diagnostics are performed is to have the sensors measure an operational parameter value and send the value to an analog-to-digital converter. The analog-to-digital converter converts the value to a digital signal and reports the value to a host computing system coupled to the transceiver module. This allows a user or the host to then valuate the various operational parameters. In order to make good use of optical linkage, some systems adopt burst mode data transfer. While burst mode transmissions may reduce the cost of data transmission via optical link, presently there are no standards for digital diagnostics as applied to burst mode transmission. As a result, it may be difficult to perform digital diagnostics, monitoring, calibration and/or synchronization processes on burst mode transmissions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one example, an optical line termination includes instructions stored on a computer-readable medium, the instructions including a digital diagnostic table, and a plurality of entries within the diagnostic table, wherein a first entry is associated with a first optical network unit, the first entry including at least one setting for performing burst mode digital diagnostic processes using a first burst mode transmission received from the first optical network unit.

In another example, a method of performing digital diagnostics is provided that includes receiving burst mode transmissions in an optical line termination from a plurality of optical network units, The burst mode transmission include a first burst mode transmission from a first optical network unit. The method also includes identifying the first optical network unit from data contained in the first burst mode transmission, accessing a digital diagnostics table associated with the first optical network unit, the table including at least one setting specific to the first optical network unit for performing digital diagnostics using the first burst mode transmission, and applying at least one setting specific for performing digital diagnostics using the first burst mode transmission.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

A system and method are provided herein for performing digital diagnostics and other processes on burst mode transmissions. In one example, an optical line termination (OLT) is coupled to a passive optical network. The OLT includes a digital diagnostic table with entries corresponding specifically to any number of optical network units (ONUs) that are in communication with the OLT. The digital diagnostic table allows the OLT to apply settings specific to each ONU to allow digital diagnostics to be applied to burst mode transmissions from several ONUs while increasing the sensitivity and dynamic range of the receiving process.

In one example, a setting optimization process is performed on a first burst mode transmission. The setting optimization process yields settings that are then stored in the digital diagnostics table. The settings from the first burst mode transmission are then used on a subsequent burst mode transmission to provide increased sensitivity and/or accuracy for performing monitoring, digital diagnostics, clock recovery and/or power synchronization. The setting optimization process may be performed at each burst mode receiving or at various interval.

In another example, the setting optimization process may be also removed or disabled in the application. The burst mode receiving settings may be retrieved from the pre-store diagnostic table. The OLT may use the received optical power as the index to retrieve the information. The pre-store table can be the results from factory or results borrowed from other OLTs.

In the following description, numerous specific details are set forth in order to provide a thorough understanding of the system and method. It will be obvious, however, to one skilled in the art that the present system and method may be practiced without these specific details.

Figure 1:
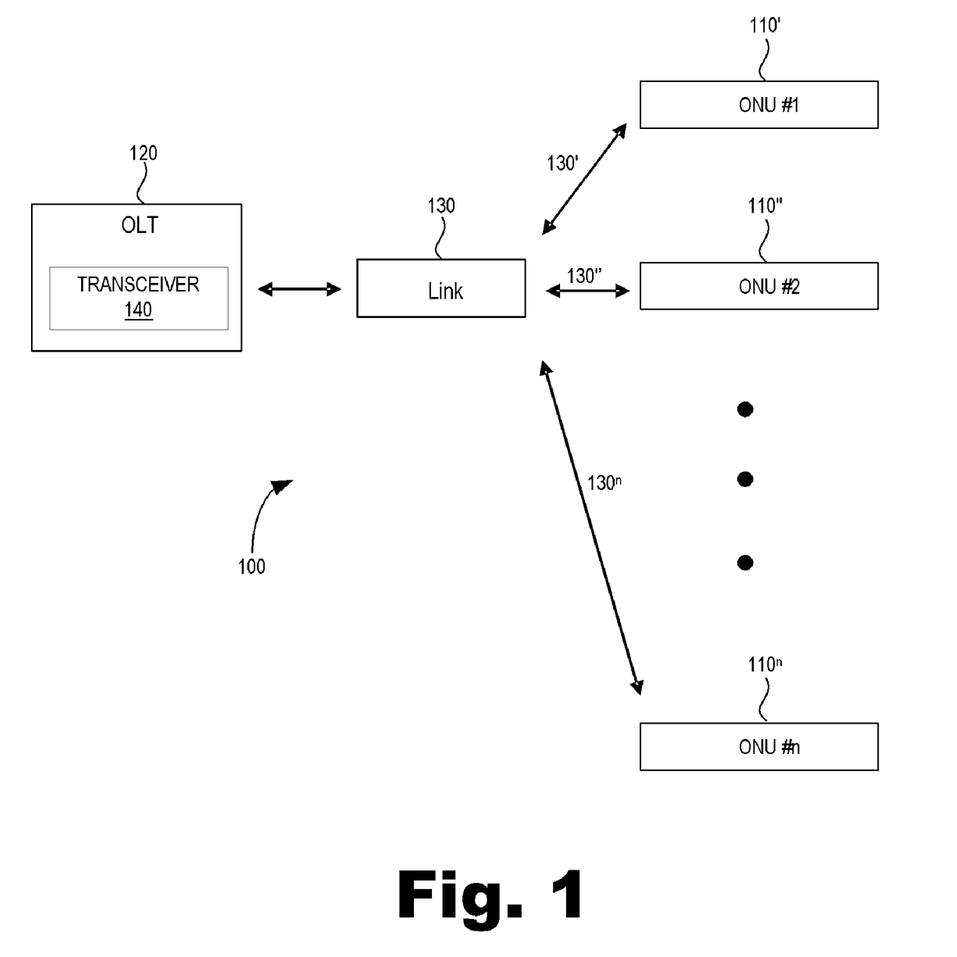
FIG. 1 illustrates a schematic view of a passive optical network according to one example.

FIG. 1 is a schematic view of a passive optical network (PON) 100. The PON 100 includes several optical network units 110', 110", 110$^n$ coupled to an optical line termination (OLT) 120 by several network links 130', 130", 130$^n$. The use of the superscripts n emphasizes that any number of ONUs may be coupled to the OLT 120.

According to the present example, the ONUs 110', 110", 110$^n$ are optical transceivers configured to communicate with the OLT 120 using optical signals that are sent and received over the links 130', 130", 130$^n$. Consequently, the links 130', 130", 130$^n$ may be fiber optic links configured to carry optical signals. The ONUs 110', 110", 110$^n$ described herein may be implemented in optical (e.g., laser) transmitter/receivers of any form factor such as XFP, SFP and SFF, without restriction.

Further, one or more of the ONUs 110', 110", 110$^n$ are configured to transmit data in a burst mode. Burst mode transmission is a high-speed data transfer mode that can re-use the same transfer medium. As used herein, a discussion of burst mode transmission shall be equally applicable to the transmission itself as to the characteristics of the optical network unit and/or other parts of the passive optical network, including the optical line termination. For ease of reference, the ONUs 110', 110", 110$^n$ will be described in the context of converting electrical signals into optical signals, and transmitting the optical signals over the corresponding links 130', 130", 130$^n$ to the OLT 120.

The ONUs 110', 110", 110$^n$ may be located more closely to a client device while the OLT 120 may be located more closely to a server device. As a result, the OLT 120 may allow a server or other centralized system to communicate with distributed devices.

The OLT 120, according to the present example, may include an optical transceiver 140. For ease of reference, the OLT 120 will be described in the context of receiving the optical signals transmitted over the links 130', 130", 130$^n$. The OLT 120 then converts the optical signals. Additionally, the OLT 120 is configured to provide monitoring, digital diagnostics, receiving control and synchronization for each of the ONUs 100', 110", 110$^n$. In particular, as will be discussed in more detail below, the OLT 120 is configured to store optimized settings for monitoring, digital diagnostics, and synchronization operations.

By storing optimized settings for each of the ONUs 110', 110", 110$^n$, the OLT 120 is able to provide increased sensitivity for performing the above-described operations on burst mode receiving for each of the ONUs 110', 110", 110$^n$. For example, several factors may affect a signal as it is transmitted by the ONUs 110', 110", 110$^n$ and as the signal is received and converted by the OLT. These factors cause a difference between the power of the transmitted signal on the ONU side and the signal received on the OLT side. These factors may be specific to each ONU and may vary between ONUs. Some of these factors include, without limitation, transceiver temperature, transceiver supply voltage, laser bias current, transceiver receive power, transceiver transmit power, optical link information, or transmission clock phase. The OLT 120 may be configured to perform digital diagnostics and monitoring of such factors. Further, the OLT 120 may be configured to synchronize the transmit power of the ONUs to the receive power for the OLT transceiver. One method of performing digital diagnostics and synchronization for several ONUs will now be introduced from the vantage point of an OLT, followed by a discussion of more detailed implementations within an OLT.

Figure 2:
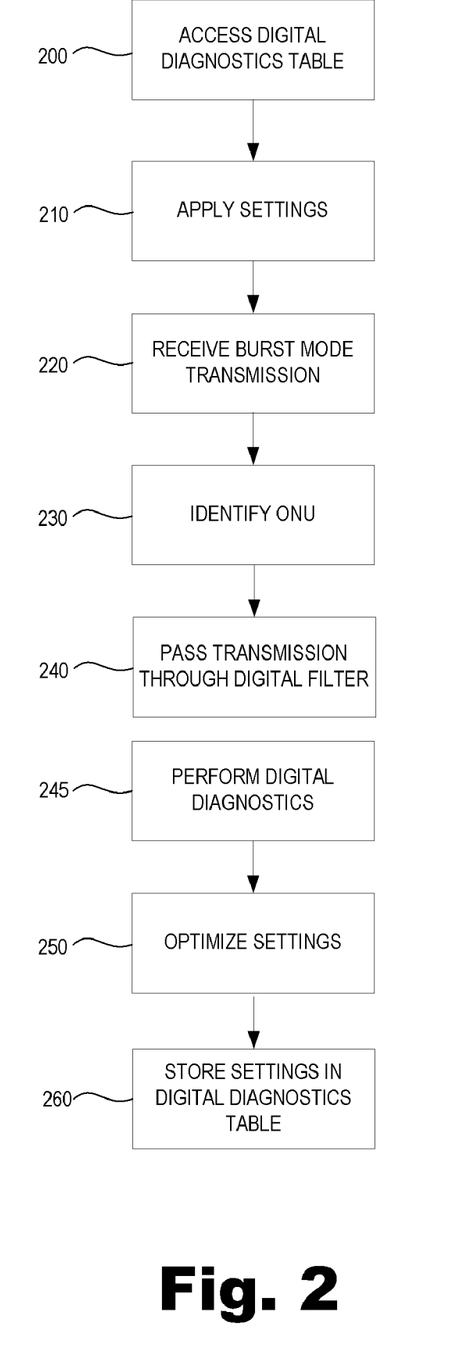
FIG. 2 is a flowchart illustrating a method of performing digital diagnostics and power synchronization on burst mode transmissions according to one example.

FIG. 2 is a flowchart illustrating a method of performing digital diagnostic monitoring and burst mode synchronization within an OLT according to one example. In particular, a controller may be operating in the OLT to control the operation of various components within the OLT as well as to perform one or more of the processes described below. As illustrated in FIG. 2, the method begins at 200 when initially the OLT accesses the digital diagnostics table. This may occur before the OLT receives the burst mode transmission. The OLT schedules which ONU to transmit by sending the information via downstream transmission.

Once the OLT retrieves the ONU burst transmission information, at 210, the OLT may apply the optimal receiving information by establishing receiver settings. Each ONU has specific factors that may affect the transmitted signal and thus may include specific settings that can be used in preparing the transmission to be sent to a receiver. The optimal receiving information may include gain setting, threshold, receiving clock frequency and/or phase. The receiving information may allow the OLT to extract the data from the burst mode transmission faster and with better sensitivity by establishing receiver settings appropriate for the conditions.

After the receiving settings are applied, at 220 the OLT may begin to receive the burst transmission from ONUs. The burst mode transmission may include the machine address control (MAC) address of the transmitting ONU. Using the MAC addresses, at 230 the OLT is then able to identify the ONU that initiated the transmission. At 240, the process continues when the OLT passes the transmission through a digital filter associated with the identified ONU. Individual digital filters may be configured for use with one or more specific ONU to remove noise associated with the ONU to thereby improve monitoring accuracy. Thereafter, at 245 digital diagnostics may be performed using the transmission.

After the digital diagnostics have been performed, at 250 the OLT may optimize the receiving settings for receiving the subsequent burst transmission. In one example, the OLT may detect the received optical power from one ONU, and optimize the gain setting accordingly. The OLT may also optimize the detection threshold and phase to achieve better sensitivity. Each ONUs may have one set of the mentioned settings in the digital diagnostics table. The OLT can report the setting, received optical power of individual ONU, optimal receiving setting, or other information to indicate the status of the network. The digital diagnostics table includes one or more settings for each ONU that may be applied to the transmission for use in performing digital diagnostics, synchronization, monitoring, and/or calibration on the burst mode transmission. The entries in the table may be initially set to any desired value. In one example, the initial values may represent settings corresponding to an initial estimate of appropriate values for the settings.

In another example, the initial values may be varied periodically, such as between a low value, an intermediate value, and a high value. An initial value may be used in processes described below to determine an initial range of values with which the digital diagnostics and other functions yield results within a desired range. If the first selected value does not achieve the desired results, the OLT may change the set values stored in the digital diagnostic table until the desired sensitivity or other results are achieved.

At 260, the optimized settings are then stored in the appropriate portion of the digital diagnostics table. When a subsequent burst mode transmission from the same ONU is received, the optimized settings may be used to obtain more accurate results. Two exemplary implementations of an OLT will now be discussed, followed by a discussion of a technique for sampling burst mode transmissions.

Figure 3:
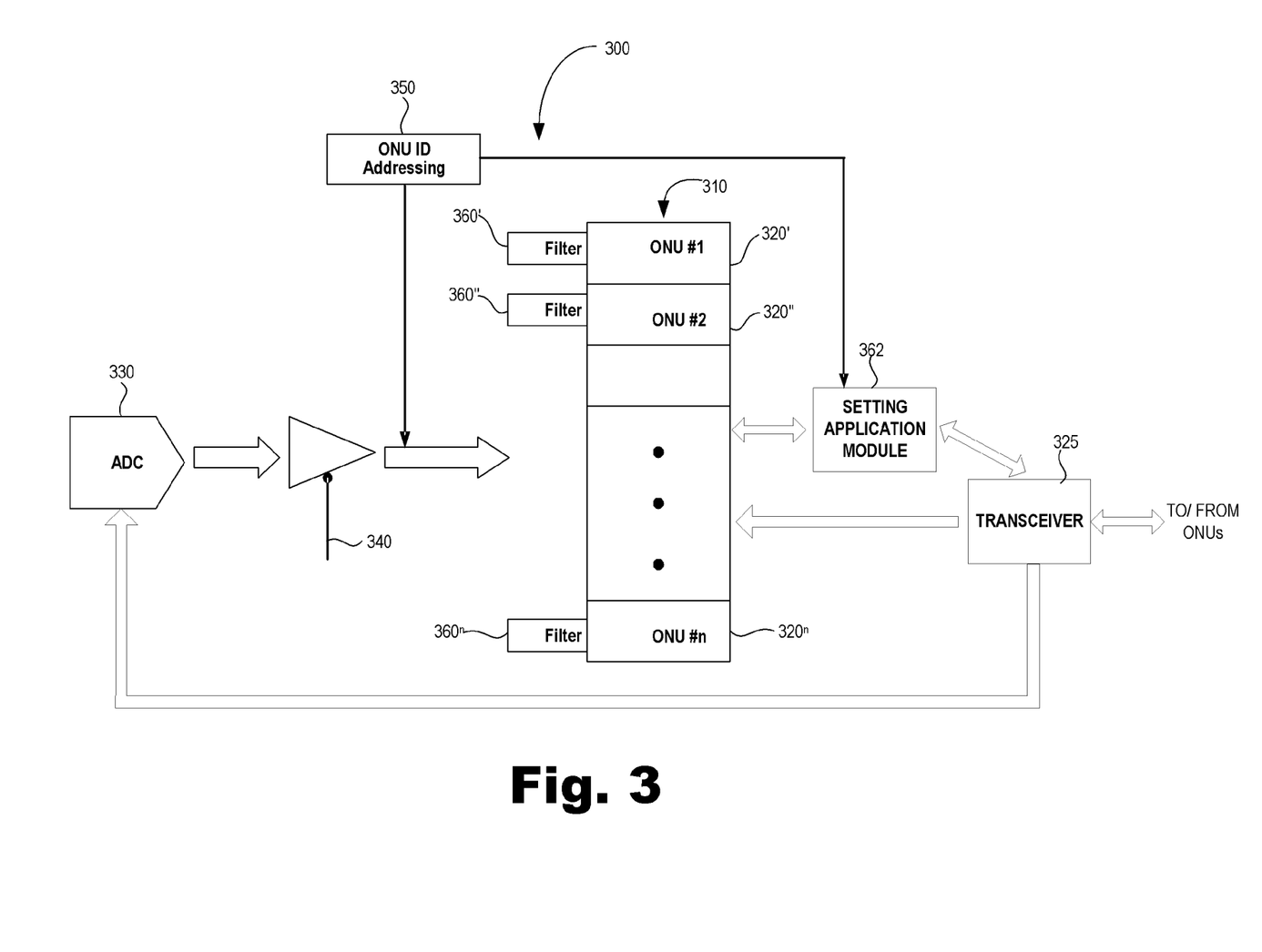
FIG. 3 is a schematic view of an optical line termination configured to perform digital diagnostics on burst mode transmissions according to one example.

FIG. 3 is a schematic view of an OLT 300 configured to perform digital diagnostics and other functions on burst mode transmissions. The OLT 300 is configured to receive the burst mode transmissions from more than one ONU (not shown). The digital diagnostics and control operations may make use of a digital diagnostics table 310 that includes ONU settings 320', 320", 320". There may be one or more ONU setting values stored in the table for each of the ONUs coupled to the OLT 300.

The digital diagnostics table 310 may allow for preparation of settings which allow the OLT 300 to synchronize the transmit power of the transmitting ONU to the receiver power of a transceiver 325. The digital diagnostics table 310 and the synchronization of transmit and receive power may allow the OLT 300, that may include the transceiver 325, a host system, and/or an external device to perform digital diagnostics on the burst mode transmission/receiving and for increasing the sensitivity in burst mode receiving and increasing the accuracy in monitoring such conditions as transceiver temperature, transceiver supply voltage, laser bias current, transceiver receive power, and/or transceiver transmit power. The settings stored in the ONU settings 320', 320", 320" are applied to the burst mode transmission before the burst mode transmission is received by the transceiver 325. The transceiver may in turn be coupled to a host system that receives the transmission for further processing as well as to other digital diagnostic equipment as desired.

The burst mode transmissions may include analog fiber optic signals sent from the ONUs over network links to the OLT 300. An analog to digital converter (ADC) 330 converts the analog optical signals to digital signals. The digital signals are then transmitted to a switch 340. The use of the digital diagnostics table 310 may be disabled as desired using a switch 340. In one example, when the switch 340 is off or opened, the switch isolates the digital diagnostic table 310 from the ADC 330 such that the burst mode transmission is prevented from reaching the digital diagnostic table 310.

In some cases, it may be desirable to direct burst mode transmissions away from the digital diagnostic table 310. In particular, the switch 340 may be off when continuous mode transmissions are received by the OLT 300. In such a situation, while the switch 340 is thus off, the transmission may be directed elsewhere for processing. Further, the switch 340 may be configured to be selectively activated as desired.

If the switch 340 is on, then the transmission is sent toward the digital diagnostics table 310. In particular, an ONU ID addressing module 350 analyzes a MAC address included with the burst mode transmission to determine which ONU sent the burst mode transmission. The ONU addressing module 350 uses the ONU ID/MAC address to determine how to further process the burst mode receiving. Further, the ONU ID addressing may be operatively associated with the path of the transmission to the digital diagnostic table 310 as well as the setting application module 362.

En route to the digital diagnostics table 310, the burst mode transmission is first passed through one of the filters 360', 360", 360" that is associated with the entry in the digital diagnostics table 310. The filters 360', 360", 360" may be configured to remove predictable error from the transmission. For example, predictable error may be present in the burst mode transmission due to such factors as stable characteristics in the passive optical network, such as the length or other characteristics of the link between the OLT and each ONU. Any number of factors may also be analyzed by the filters 360', 360", 360". While several factors may be stable in their predictability, these factors may also be specific to each ONU. Accordingly, separate filters may be associated with each ONU ID setting 320', 320", and 320n.

After a burst mode transmission is passed through one of the filters 360', 360", 360", the transmission is routed to the specific ONU ID setting 320', 320", and 320n. In an initial or setup phase, any number of initial values may be stored in the entries for the ONU ID setting 320', 320", 320". These settings may include optimal settings to be applied to the burst mode transmission before the transmission is sent to the transceiver 325. The OLT 300 accesses the settings and routes the results to a setting application module 362. The setting application module 362 then applies settings, such as the gain settings, and sends the burst mode transmission to the transceiver 325. The gain settings may, for example, be used to synchronize the receive power of the transceiver 325 to the transmit power of the ONU that transmitted the signal.

The OLT 300 may be further configured to prepare optimized settings for use with subsequent burst mode transmissions. In one example, the optimized settings may be prepared in the setting application module 362 or other module within the OLT 300.

Figure 4:
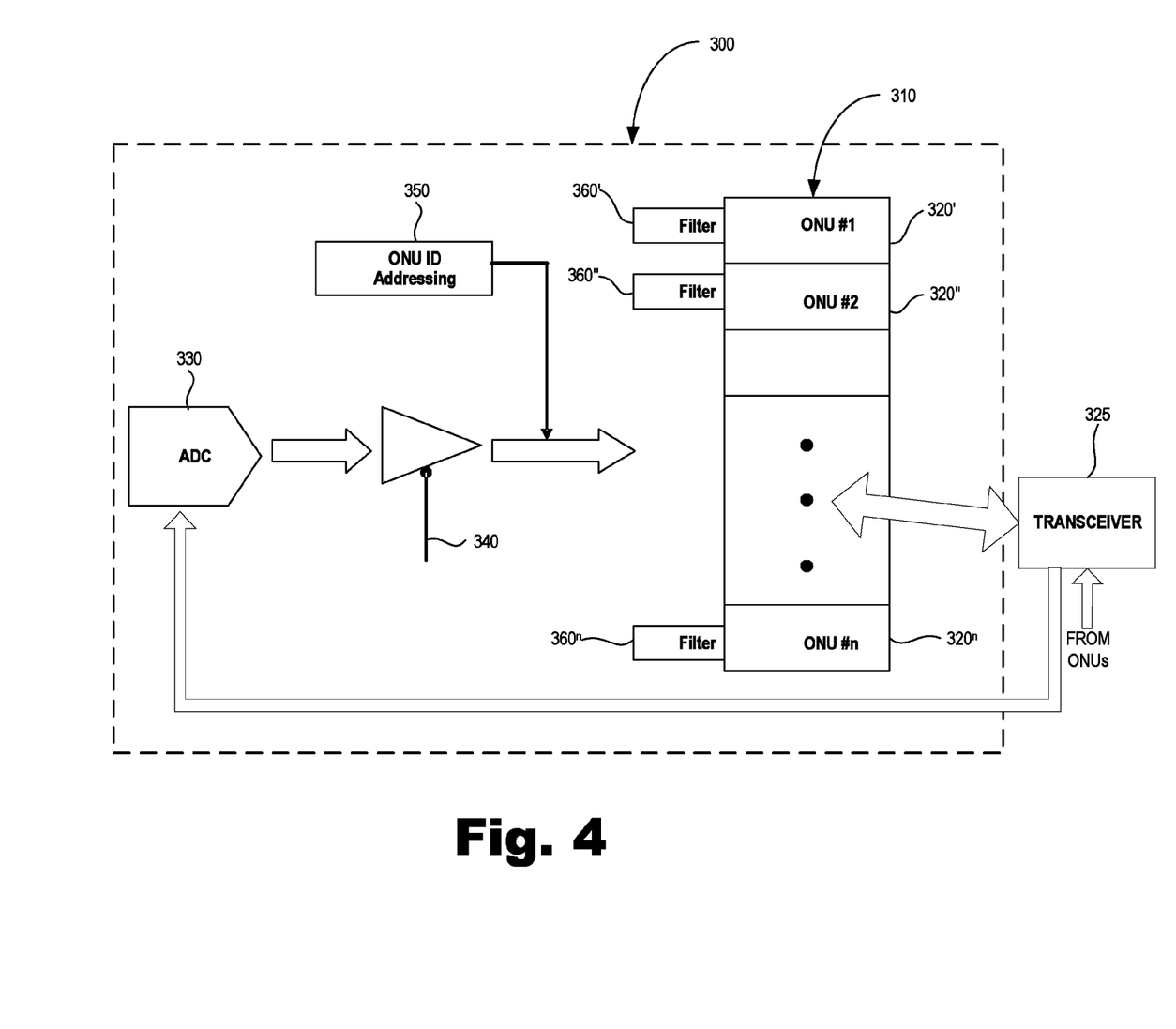
FIG. 4 is a schematic view of an optical line termination configured to perform digital diagnostics on burst mode transmission according to one example.

In another example illustrated in FIG. 4, the values from the digital diagnostics table 310 are sent directly to the transceiver 325. The transceiver 325 is configured to implement the settings, such as the gain presets. The transceiver 325 may also be configured to optimize the settings, after which the transceiver 325 sends the optimized settings back to the digital diagnostics table 310, where they are stored for use on subsequent burst mode transmissions.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of computer-executable instructions or data structures, and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data that cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An optical line termination, comprising:
   instructions stored on a computer-readable medium, the instructions including a digital diagnostic table, and
   a plurality of entries within the diagnostic table, wherein a first entry is associated with a first optical network unit, the first entry including at least one setting for performing burst mode digital diagnostic processes using a first burst mode transmission received from the first optical network unit,
   wherein the at least one setting for performing burst mode digital diagnostic processes includes optical receiving information which is applied as receiver settings at the optical line termination before the first burst mode transmission is received from the first optical network unit.

2. The optical line termination of claim 1, further comprising a setting application module configured to analyze the first burst mode transmission to prepare at least one optimized setting and to store the optimized setting in the first entry associated with the first optical network unit for application to subsequent burst mode transmissions from the first optical network unit.

3. The optical line termination of claim 1, wherein the first setting includes at least one of receiving settings, detection threshold, and phase settings.

4. The optical line termination of claim 3, wherein the optical line termination is configured to use the first power gain setting of a transmit power of the first optical network unit to synchronize receive power for a receiver.

5. The optical line termination of claim 1, further comprising each of the plurality of entries being associated with a different optical network unit and each entry including settings specific to an optical network unit associated therewith.

6. The optical line termination of claim 1, further comprising at least one digital filter associated with each of the entries in the digital diagnostics table.

7. The optical line termination of claim 1, further comprising a switch configured to selectively enable and disable use of the digital diagnostic table.

8. A passive optical network, comprising:
   an optical line termination;
   a first optical network unit configured to send burst mode transmissions;
   a first network segment coupling the first optical network unit to the optical line termination;
   a digital diagnostics table residing on the optical line termination, the digital diagnostics table include at least one entry specific to the first optical network unit configured to send burst mode transmissions; and
   a receiver coupled to the optical line termination, wherein the at least one entry in the digital diagnostics table includes at least one setting for performing burst mode digital diagnostic processes, the at least one setting including optical receiving information which is applied as receiver settings at the receiver before the first burst mode transmission is received from the first optical network unit.

9. The passive optical network of claim 8, wherein the settings for providing digital diagnostics include at least one power gain setting.

10. The passive optical network of claim 9, wherein the optical line termination is configured to analyze a burst mode transmission from a first optical network unit to prepare optimized settings for the first optical network unit and to store the optimized settings in the entry associated with the first optical network unit.

11. The passive optical network of claim 9, wherein the receiver is configured to analyze a burst mode transmission from a first optical network unit to prepare optimized settings for the first optical network unit and to store the optimized settings in the entry associated with the first optical network unit.

12. The passive optical network of claim 8, wherein the optical line termination is configured to use the at least one entry to synchronize receiver power settings for the receiver to transmit power settings for the first optical network unit.

13. The passive optical network of claim 8, wherein the optical line termination is configured to identify which optical network unit sent a burst mode transmission by analyzing a machine address control address included in the burst mode transmission.

14. The passive optical network of claim 8, further comprising at least one digital filter associated with the at least one entry specific to the first optical network unit, the at least one digital filter configured to remove noise associated with the first optical network unit at the optical line termination.

15. A method of performing digital diagnostics, comprising:
   receiving at an optical line termination a first burst mode transmission from a first optical network unit;
   identifying the first optical network unit from data contained in the first burst mode transmission;
   accessing a digital diagnostics table associated with the first optical network unit, the table including at least one setting specific to the first optical network unit for performing digital diagnostics using the first burst mode transmission, wherein the at least one setting specific to the first optical network includes an optimal receiver setting for the optical line termination for receiving the first burst mode transmission from the first optical network;
   applying at least one setting specific for performing digital diagnostics using the first burst mode transmission; and
   applying the optimal receiver setting at the optical line termination.

16. The method of claim 15, further comprising preparing optimized settings for use with a second burst mode transmission from the first optical network, the second burst mode transmission being subsequent to the first burst mode transmission.

17. The method of claim 16, wherein preparing optimized settings for use with a second burst mode transmission is performed in the optical line termination.

18. The method of claim 15, wherein identifying the first optical network unit includes receiving a machine address control address.

19. The method of claim 15, wherein applying at least one setting specific for performing digital diagnostics using the first burst mode transmission includes applying at least one power gain setting to synchronize a receive power setting for a receiver to a transmit power for the first optical network unit.

20. The method of claim 15, further comprising, after identifying the first optical network unit from data contained in the first burst mode transmission, passing the first burst mode transmission through a digital filter to remove noise associated with the first optical network unit.

\* \* \* \* \*

UNITED STATES PATENT AND TRADEMARK OFFICE
CERTIFICATE OF CORRECTION

| | | |
|---|---|---|
| PATENT NO. | : 8,170,414 B2 | |
| APPLICATION NO. | : 12/023490 | |
| DATED | : May 1, 2012 | |
| INVENTOR(S) | : Liu et al. | |

It is certified that error appears in the above-identified patent and that said Letters Patent is hereby corrected as shown below:

On the Face Page, in Field (74), under "Attorney, Agent, or Firm", in Column 2, Line 1, delete "Machoff" and insert -- Maschoff --, therefor.

In Column 3, Line 62, delete "100'," and insert -- 110', --, therefor.

Signed and Sealed this
Seventeenth Day of July, 2012

David J. Kappos
*Director of the United States Patent and Trademark Office*